United States Patent [19]

Inagaki et al.

[11] Patent Number: 5,393,329
[45] Date of Patent: Feb. 28, 1995

[54] FUEL-SORBING DEVICE USING LAYERED POROUS SILICA

[75] Inventors: Shinji Inagaki; Yoshiaki Fukushima; Takashi Ohta; Akane Okada, all of Aichi, Japan

[73] Assignee: Kabushiki Kaisha Toyota Chuo Kenkyusho, Japan

[21] Appl. No.: 937,032

[22] Filed: Aug. 31, 1992

Related U.S. Application Data

[63] Continuation-in-part of Ser. No. 820,167, Jan. 13, 1992, abandoned.

[30] Foreign Application Priority Data

Sep. 6, 1991 [JP] Japan .................................. 3-255723

[51] Int. Cl.$^6$ .................... B01D 53/14; B01J 20/10
[52] U.S. Cl. ...................................... 96/131; 95/146; 95/902; 96/154; 123/519; 502/407
[58] Field of Search ................ 55/74, 387; 502/232, 502/407; 95/902, 146; 123/519; 96/131, 154

[56] References Cited

U.S. PATENT DOCUMENTS

| | | | |
|---|---|---|---|
| 2,574,434 | 11/1951 | Greentree et al. | 502/407 |
| 3,581,782 | 6/1971 | Onufer | 55/387 |
| 3,727,379 | 4/1973 | Bijleveld et al. | 55/74 |
| 3,763,839 | 10/1973 | Alquist | 123/519 |
| 3,844,739 | 10/1974 | Alfrey | 55/74 |
| 3,884,835 | 5/1975 | Vaughan | 502/407 |
| 3,901,826 | 8/1975 | Hofstadt et al. | 502/407 |
| 4,011,302 | 3/1977 | Defrawi | 264/53 |
| 4,039,489 | 8/1977 | Fletcher et al. | 260/2.5 AD |
| 4,191,813 | 3/1980 | Reed et al. | 521/31 |
| 4,216,188 | 8/1980 | Shabrai et al. | 423/118 |
| 4,689,315 | 8/1987 | Anton et al. | 502/232 |
| 4,703,029 | 10/1987 | Rieck et al. | 502/232 |
| 4,781,818 | 11/1988 | Reagan et al. | 423/327.1 |
| 4,781,906 | 11/1988 | Cahen et al. | 502/232 |
| 4,861,510 | 8/1989 | Wilms et al. | 502/407 |
| 4,954,325 | 9/1990 | Rubin et al. | 502/64 |
| 4,968,652 | 11/1990 | Johnson et al. | 502/63 |
| 5,045,295 | 9/1991 | Tannous et al. | 423/716 |
| 5,063,039 | 11/1991 | Valyocsik | 502/232 |

FOREIGN PATENT DOCUMENTS 50-8785  1/1975  Japan .................................. 502/232

OTHER PUBLICATIONS

Tsuneo Yanagisawa, et al; "The Preparation of Alkyl-trimethylammonium–Kanemite Complexes and Their Conversion to Microporous Materials"; The Chemical Society of Japan, vol. 63, No. 4, Apr., 1990, pp. 988–992.

Primary Examiner—Jay H. Woo
Assistant Examiner—Duane S. Smith
Attorney, Agent, or Firm—Stroock & Stroock & Lavan

[57] ABSTRACT

A fuel-sorbing device excellent in sorbing evaporated fuel includes a sorbent of layered porous silica for capturing evaporated fuel and a container which houses the sorbent and into which the evaporated fuel is introduced. The layered porous silica is composed of a plurality of superposed sheets made of a framework of $SiO_2$. Adjacent sheets are partly bonded each other to form a three-dimensional framework having a large number of pores. The sorbent can be used in combination with an organic polymer sorbent, so as to sorb evaporated fuel in two stages.

14 Claims, 5 Drawing Sheets

F I G. 1(a)
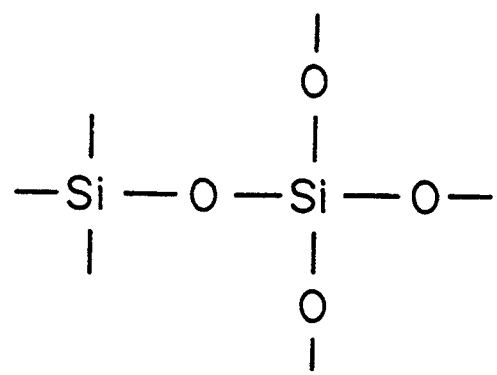
F I G. 1(b)
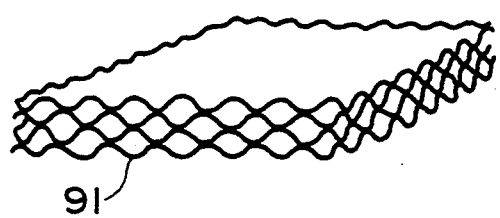
F I G. 1(c)
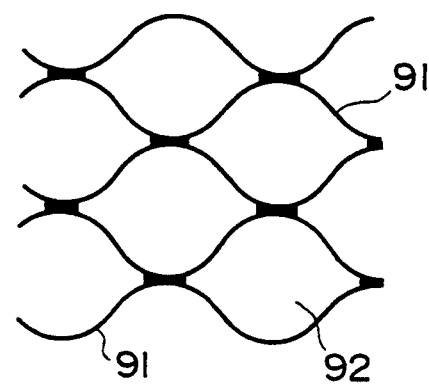

FUEL-SORBING DEVICE USING LAYERED POROUS SILICA

This is a continuation-in-part application of application Ser. No. 07/820,167 filed on Jan. 13 1992. NOW ABANDONED for POROUS MATERIAL COMPOSED OF LAYERED SILICA AND METAL OXIDE AND A PROCESS FOR MANUFACTURING THE SAME.

BACKGROUND OF THE INVENTION

1. Field of the Invention

The present invention relates to a fuel-sorbing device, such as a canister to be attached to a fuel tank of an automobile. More particularly, it relates to a fuel-sorbing device using a particular sorbent.

2. Description of the Related Art

A relatively large amount of fuel evaporates at the time when it is fed by a feeding gun into a fuel tank of an automobile. Part of the fuel contained in a fuel tank or in the float chamber of a carburetor also evaporates not only when the automobile is running, but also when it is not running. Because of this, a canister filled with a sorbent is positioned between the tank and the open space, in order to capture the evaporated fuel and to avoid its leakage into the atmosphere.

Fuel-sorbing devices charged with a sorbent are also used in order to capture fuels evaporated from fuel-storage tanks other than those of automobiles, as well as to capture fuels leaked therefrom.

Powders or granules of active carbon have been used as a sorbent in the prior fuel-sorbing devices, including canisters.

When a canister has sorbed evaporated fuel almost to its maximum sorbing capacity, air is introduced into the device in order to desorb (or purge) the fuel out of the active carbon. The purged canister is again used to sorb evaporated fuel.

However, when such a canister is used, there often occur cases wherein evaporated fuel is captured only insufficiently, and part of it released into the atmosphere.

That is, the fuel-capturing capability (or working capacity) of active carbon is not sufficiently high.

Of fuel components captured by the active carbon housed in a canister, relatively small molecules containing 5 carbon atoms or less can be readily desorbed during the purging (desorbing) step, whereas it is difficult to completely desorb larger molecules (or molecules containing 6 or more carbon atoms) by the purging.

Because of this, when active carbon is subjected to purging repeatedly, larger molecules gradually accumulate in the active carbon, and the working capacity of the sorbent deteriorates with the lapse of time.

A marked deterioration in the working capacity of carbon atom is also observed when evaporated fuel is condensed and liquefied on the inner wall of a canister or a connecting pipe, and the active carbon is soaked with the liquefied fuel. If active carbon is used in an increased amount sufficient to rectify the above deficiency, the size of the canister would become undesirably large, posing various restrains on the designing of automobiles, or the like.

Thus, prior canisters using active carbon are often insufficient in their capability of capturing evaporated fuel and hence, part of evaporated fuel is released into the atmosphere, causing air pollution.

SUMMARY OF THE INVENTION

It is an object of this invention to provide a fuel-sorbing device having an enhanced capability of capturing evaporated fuel.

The gist of this invention rests on a fuel-sorbing device comprising a sorbent for capturing evaporated fuel and a container which houses the sorbent and into which evaporated fuel is introduced, said sorbent being a layered porous silica.

The layered porous silica can be used either as the sole sorbent or in combination with other sorbent (s), for example, organic polymers having the capability of sorbing fuel.

The above and other objects, features and advantages of the present invention will become more apparent from the following description when taken in conjunction with the accompanying drawings in which preferred embodiments of the invention are shown by way of illustrative examples.

BRIEF DESCRIPTION OF THE DRAWINGS

FIGS. 1(a) to 1(c) are illustrations explaining a layered porous silica.

DETAILED DESCRIPTION OF THE INVENTION

Figure 2:
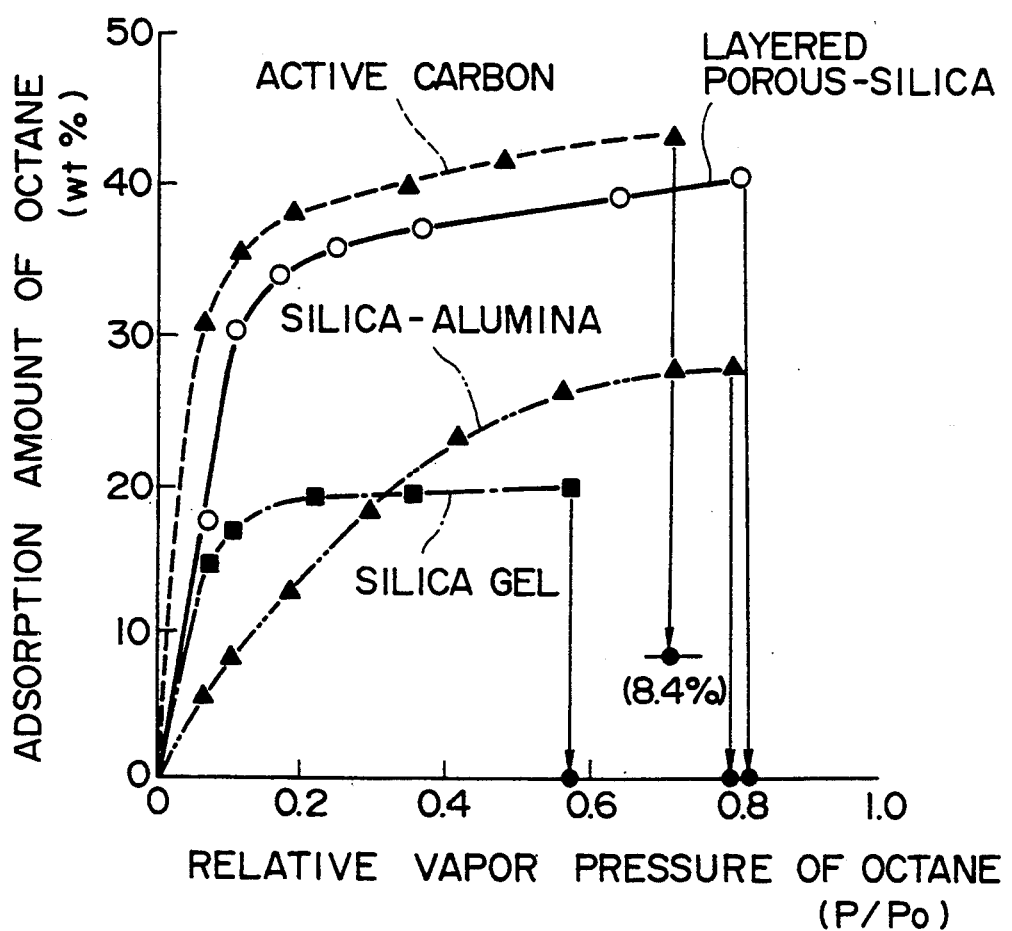
FIG. 2 is a graph showing the adsorption isotherm of octane, measured in Example 1.

In a first aspect, this invention is concerned with a fuel-sorbing device comprising a sorbent for capturing evaporated fuel and a container which houses the sorbent and into which the evaporated fuel is introduced, said sorbent being a layered porous silica.

As is described hereinbelow in detail, layered porous silica has an excellent capability of capturing evaporated fuel. In addition, fuel molecules sorbed on or in the sorbent can be readily desorbed, irrespective of the size of the sorbed molecules. In other words, large molecules containing 6 or more carbon atoms can also be purged out quite easily. Layered porous silica has a skeleton of $SiO_2$, as shown in FIG. 1(a). It is basically consisted of layered sheets 91, 91 . . . , which are superposed each other as shown in FIG. 1(b). Each sheet is thin and bent, and adjacent sheets are bonded partly to each other to form a three-dimensional framework, as shown in FIG. 1(c). Between adjacent sheets so bonded, there exist a large number of pores 92 having a diameter of 10 to 60 Angstroms (Å).

In X-ray diffraction patterns of layered porous silica, there is observed only one peak (which corresponds to the diameter of 10 to 60 Å), except for halo peaks indicating the amorphous state of silica. Layered porous silica has a surface area of up to 900 m²/g [Bull. Chem. Soc. Jpn., Vol. 63, 988–992, 1990].

Layered porous silica can be synthesized from crystalline layered sodium silicate. Typical but non-restrictive examples of usable crystalline layered sodium silicate include kanemite ($NaHSi_2O_5 \cdot 3H_2O$), sodium disilicate ($Na_2Si_2O_5$), makatite ($Na_2Si_4O_9 \cdot 5H_2O$), ilelite ($Na_2Si_8O_{17} \cdot xH_2O$), magadiite ($Na_2Si_{14}O_{29} \cdot xH_2O$) and kenyaite ($Na_2Si_{20}O_{41} \cdot xH_2O$).

Layered porous silica can be obtained, e.g., in the following manner: One of the above layered sodium silicate is heated with stirring in an aqueous solution of alkyltrimethyl ammoniums, and then subjected to filtering. After being dried, the product collected by filtration is heated (700° C.) in air to give a layered porous silica.

Layered porous silica can be used in the form of granules, including spheres and columns. In the case of spheres, a diameter in the range of 0.1 to 10 mm can be preferred. In the case of columns, a diameter in the range of 0.1 to 5 mm and a length in the range of 1 to 30 mm can be preferred. When the size of spheres or columns is smaller than the above limits, there may be resulted a poor permeability, and hence evaporated fuel may penetrate into the sorbent only insufficiently. When the size of spheres and columns is greater than the above upper limits, evaporated fuel may pass through the sorbent without being fully sorbed.

There is no particular restriction on the shape, structure, etc., of the container for the sorbent, provided that the sorbent can be housed in the container and that the evaporated fuel can be introduced thereinto.

"The fuel-sorbing device" according to this invention can be used not only as a canister of automobiles, but also in various other uses, including fuel trappers to be used for fuel tanks of boilers.

In a second aspect, this invention is concerned with a fuel-sorbing device comprising sorbents for capturing evaporated fuel and a container which houses the sorbents and into which the evaporated fuel is introduced, said container being consisted of a first chamber charged with a sorbent other than layered porous silica and a second chamber filled with a layered porous silica, said sorbent other than layered porous silica being capable of dissolving into, or swollen by, the evaporated fuel, and said first and second chambers being so constituted that the evaporated fuel is introduced into said second chamber after having passed through said first chamber.

In combination with layered porous silica, there can be used a large variety of sorbents capable of sorbing and desorbing evaporated fuels, including active carbon, zeolites, silica gel, organic polymers, and the like.

A typical example of such a combination includes a combination consisting of a layered porous silica and an organic polymer. In this case, the fuel-sorbing device comprises sorbents for capturing evaporated fuel and a container which houses the sorbents and into which the evaporated fuel is introduced, said container being consisted of a first chamber charged with an organic polymer and a second chamber charged with a layered porous silica, said organic polymer being capable of dissolving into, or swollen by, the evaporated fuel, and said first and second chambers being so constituted that the evaporated fuel is introduced into said second chamber after having passed thought said first chamber.

Examples of usable organic polymers include the following:

thermoplastic resins, such as polycarbonate resins, acrylic resins, ABS resins, acetal resins, coumarone-indene resins, celluloses regenerated from ketone resins, petroleum resins, cellusose derivatives, fluorine resins, polyamides, polyimides, polyethylenes, polyethylene terephthalates, polyvinylidene chlorides, polyvinyl chlorides, polystyrenes, polyphenylene oxides, and the like;

thermosetting resins, such as silicone resins, amino resins, vinyl ester resins, phenolic resins, epoxy resins, allyl resins, alkyd resins vinyl ethers, unsaturated polyester resins, furan resins, polyamidopolyimides, polyimides, and the like;

natural rubbers obtainable from Hevea brasiliensis, and derivatives of, and products similar to, natural rubbers, such as cyclized natural rubbers, liquefied natural rubbers, guttapercha, chicle rubbers, balata, and the like;

synthetic rubbers, such as acrylic rubbers, ethylene acrylic rubbers, silicon rubbers, hydrogenated NBRs, carboxylated NBRs, urethane rubbers, chlorinated polyethylenes, chlorosulfonated polyethylenes, chloroprene rubbers, brominated butyl rubbers, telechelic rubbers, fluorinated rubbers, polyether rubbers, polysulfide rubbers, polyester rubbers, epichlorohydrin rubbers, epichlorohydrin-oxy rubbers, ethylenevinyl acetate rubbers, and the like; and thermoplastic elastomers, such as polystyrene thermoplastic elastomers, polyolefin thermoplastic elastomers, polyurethane thermoplastic elastomers, polyester thermoplastic elastomers, polyamide thermoplastic elastomers, 1,2-polybutadiene thermoplastic elastomers, ethylene-vinyl acetate thermoplastic elastomers, polyvinyl chloride thermoplastic elastomers, fluorinated rubber thermoplastic elastomers, transpolyisoprene thermoplastic elastomers, chlorinated polyethylene thermoplastic elastomers, and the like.

It can be advantageous to use a heat-resistant organic polymer. Of heat-resistant organic polymers, those containing no unsaturated bonds in their main chain can be particularly advantageous. Such organic polymers exhibit excellent heat resistance since the main chain of the polymers is hardly deteriorated by oxidation. Examples of such polymers include ethylene-propylene-diene copolymers. Gel-type derivatives of the copolymers can be particularly preferred.

Organic polymers prepared by cross-linking a polymer produced by polymerizing monomers having a saturated main chain and one or more side chains containing unsaturated bonds are also excellent in heat resistance. It is because the three-dimensional network structure develops sufficiently based on the crosslinked side chains. Examples of such polymers include crosslinked products of polyethylenepolypropylene-ethylidenenorbornene rubbers, polyacrylate-ethylidenenorbornene rubbers, and polyvinyl-methylsilicone rubbers.

Acryl rubbers can also be advantageous. Silicon-containing organic polymers, in particular those containing silicon in their main chain, also exhibit excellent heat resistance attributable to silicon. Examples of useful silicon-containing organic polymers include silicon rubbers, polysiloxanes, and polysilicates.

The above-mentioned organic polymers may be either crosslinked or non-crosslinked. In this invention, they can be used in either form. In general, non-crosslinked polymers dissolve into, or are swollen by, fuel. They are generally referred to as hydrophobic polymers.

Crosslinked polymers may be in the form of a polymer gel. Crosslinked polymer gels are insoluble to, but can be swollen by, fuel. The term crosslinking means herein not only chemical crosslinking using a crosslinking agent, but also any other forms of crosslinking, including chemical self-crosslinking and physical crosslinking.

In connection with crosslinking, the use of an organic polymer crosslinked in a swollen state can be advantageous with regard to swelling rate or the like. However, it is also possible to crosslink an organic polymer in a non-swollen state, provided that a large molecular weight can be maintained between crosslinked points.

The above-mentioned sorbents of organic polymers can be in any shape, including powders, granules, films, threads, honeycombs, plates, and the like. However, if a sorbent having an excessively large diameter or thickness is used, there may be resulted an undesirable lowering in sorbing capacity since swelling may take place only on its surface and may not proceed into its interior. It can therefore be preferred to use a sorbent having a diameter or thickness of 3 mm or less.

When contacted with evaporated fuel, non-crosslinked organic polymers dissolve or swell, whereas crosslinked polymers are swollen, but do not dissolve, as stated hereinbefore. Because of this, non-crosslinked polymers may not regain their original gathering state when subjected to regeneration. In this case, they can be used only in a disposable form. Crosslinked polymers are regenerable and hence can be used repeatedly.

The above-described sorbents of organic polymers can be consisted of organic polymers alone. If necessary, the sorbents can be incorporated with crosslinking agents or accelerators, such as peroxides, sulfur compounds, thiazoles, and amines; plasticizers, such as dimethyl phthalate, di-2-ethlyhexyl adipate, tributyl phosphate, and epoxydated soybean oil; and stabilizers, such as organic tin compounds, benzotriazole, and the like.

It is also possible to additionally incorporate into the sorbents a variety of additives, including coloring agents, such as carbon black, etc.; fillers, such as fumed silica, talc, alumina, clay, and calcium carbonate; intensifiers, such as glass fibers, etc.; surface treat agents, such as silane coupling agents and titanium coupling agents; slippery agents, such as amides of fatty acids, polyhydric alcohols, and higher fatty acids; age resistors, such as cadmium dithiocarbamale, etc.; antioxidants, such as 2,6-di-t-butyl-p-cresol (BHT), etc.; and flame retardants, such as halogen compounds and the like.

The fuel-sorbing device of the invention has a further enhanced working capacity when it is composed of a first sorbing chamber filled with one or more of organic polymer sorbents and a second sorbing chamber filled with a layered porous silica sorbent, and evaporated fuel is introduced into the second chamber after having been passed through the first chamber.

The above-described organic polymers have a high capability of capturing evaporated fuel. This capability is based on their power of dissolving into, or of being swollen by a fuel, such as gasoline or the like. This is because the affinity between the organic polymers and evaporated fuel is quite high.

In the sorbing device according to the second aspect of the invention, evaporated fuel passes through an organic polymer sorbent and a layered porous silica sorbent in the order described above. Because of this, evaporated fuel is at first sorbed by the organic polymer sorbent, and the rest is then sorbed by the layered porous silica sorbent.

The organic polymer sorbent is also highly capable of capturing large molecules containing 6 or more carbon atoms. Because of this, the load of the layered porous silica sorbent can be markedly reduced by contacting evaporated fuel with the organic polymer sorbent in advance to its contact with the layered porous silica.

In particular, in cases where evaporated fuel is contaminated with liquid, the liquid portion can be at first sorbed by the organic polymer in the first sorbing chamber. The layered porous silica therefore can be almost free from the duty of absorbing liquid.

Accordingly, the fuel-sorbing functions of the organic polymer and the layered porous silica can be divided in an effective manner, and hence the durability of the fuel-sorbing device can be further improved.

As described hereinabove, in the fuel-sorbing devices according to the first and second aspects of this invention, layered porous silica is used as a sorbent for evaporated fuel. Layered porous silica has a high capability of capturing evaporated fuel. This is because the surface of the sorbent is hydrophobic and hence is highly capable of sorbing organic substances. In addition, the ultimate working capacity of the sorbent can be quite high since it contains a large volume of pores. Furthermore, the high working capacity does not deteriorate with the lapse of time since large molecules containing 6 or more carbon atoms can also be readily desorbed.

Explanation will be given in further detail. Layered porous silica has a hydrophobic surface and hence sorbs organic substances quite well. The number of isolated hydroxide groups present on the surface of layered porous silica is smaller, in comparison with conventional silica gels marketed. In general, the hydrophobicity of a surface is reverse proportional to the number of isolated hydroxide groups present thereon. Accordingly, the surface of layered porous silica can be considered to be hydrophobic.

In addition to this, large molecules containing 6 and more carbon atoms can be readily desorbed from layered porous silica. The surface of active carbon, used in the prior art, is covered with functional groups, such as oxygen-containing functional groups. Such a surface has a strong affinity for organic substances and hence causes irreversible sorption. On the other hand, it is presumed that the surface of layered porous silica is covered with $SiO_2$ and a small quantity, if any of hydroxyl groups. Because of this, physical sorption takes place dominantly at the time when organic substances are sorbed, and hence sorbed organic substances can be readily desorbed.

The volume of pores contained in the layered porous silica is quite large. It is presumed that this large volume of pores is based on the fact that the skeleton of the porous silica is made of very thin walls which form the pores in a highly efficient manner.

As is described hereinabove, evaporated fuel can be sorbed and desorbed highly effectively by utilizing the characteristics of layered porous silica in accordance with this invention.

Accordingly, there can be provided by this invention a fuel-sorbing device which is excellent in the capability of capturing evaporated fuel.

EXAMPLES

Examples of this invention will be explained hereinbelow.

Example 1

Fuel capturing capability of layered porous silica synthesized from kanemite was determined. Results obtained are shown in FIG. 2.

For comparison, fuel-sorbing capabilities of active carbon (Kuraray Coal, trademark of Kuraray Co.), silica gel (#923 produced by Fiji Division Co.) and silica-alumina (N631L produced by JGC Corp.) are also shown in the figure. These sorbents were used in the form of granules having a diameter of 1.0 to 3.0 mm.

In the above determination, octane was used as evaporated fuel, and the fuel capturing capability of the sorbents was determined on the basis of adsorption isotherm of octane (25° C.). Upon the determination, octane was adsorbed up to the maximum capacity of the sorbents, and the sorbed octane was then desorbed. The quantity of octane remained after the desorption is shown by the mark "." in the figure.

The abscissa of FIG. 2 indicates the relative vapor pressure of octane (P/Po), and the ordinate indicates the quantity of octane sorbed (wt %).

As is seen from FIG. 2, there is no significant difference between the layered porous silica and active carbon in the quantity of octane sorbed. However, the quantity of octane remaining after the sorption (shown by the mark "." in the figure) is 0% for layered porous silica, silica gel and silica-aluminum, whereas it is 8.4% for active carbon. Since the maximum sorption of active carbon is 42%, 20% of octane remains undesorbed from active carbon.

In other words, layered porous silica is capable of desorbing 100% of octane, whereas active carbon desorbs only 80%. Accordingly, in the second sorption, there is resulted a 20% decrease or deterioration in the capturing capability of active carbon. On the other hand, layered porous silica capturing maintains its capturing capability and does not deteriorate at all (see Example 2).

Figure 3:
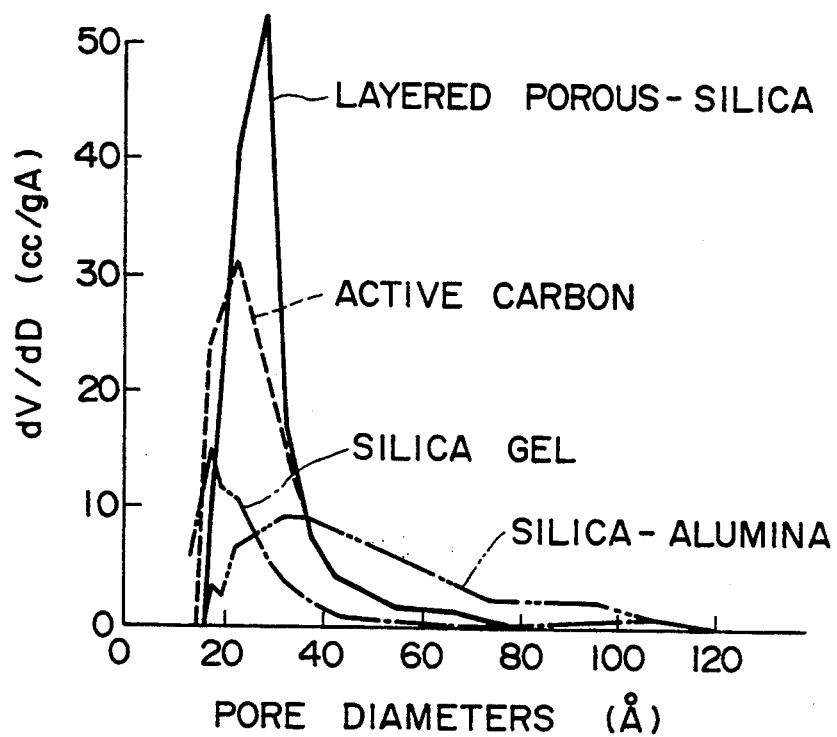
FIG. 3 is a graph showing the pore diameter distribution of a layered porous silica according to Example 1.

Table 1 shows pore volume (cc/g) and BET surface area (m²/g) of the four sorbents. FIG. 3 shows the pore-size distribution curves of the sorbents. It would be understood from Table 1 and FIG. 3 that layered porous silica has a larger pore volume and a larger BET surface area than the other sorbents. In addition, layered porous silica has a larger dV/dD (cc/gA) at smaller pore diameters, in comparison with other sorbents. The term dV/dD herein means a value obtained by differentiating pore volume by pore diameter (cc/gA).

TABLE 1

| | Pore Volume (cc/g) | BET Surface Area (m²/g) |
|---|---|---|
| Layered Porous Silica | 0.75 | 900 |
| Active Carbon | 0.65 | 1080 |
| Silica Gel | 0.25 | 555 |
| Silica-Alumina | 0.47 | 437 |

Example 2

Figure 4:
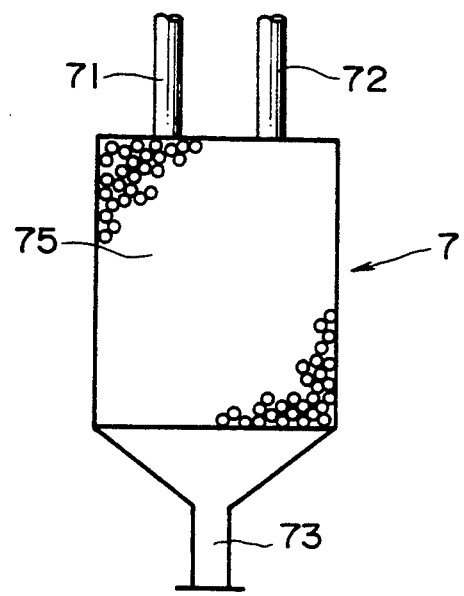
FIG. 4 is a schematic view illustrating a canister according to Example 2.

As is shown in FIG. 4, a sorbent 75 was charged into a canister 7, and the fuel-sorbing capability of the canister was determined.

The canister 7 was provided with a pipe 71 for introducing the vapor of octane, a purge pipe 72, and an air-feeding pipe 73 positioned under the sorbent 75. The internal volume of the canister was 1.4 liters. Into the canister was charged 630 g of granules of layered porous silica having a diameter of 1 to 5 mm.

Upon determination of its capturing capability, the canister 7 was allowed to stand for 1 hour at room temperature at a relative humidity of 100%. Thereafter, octance vapor was introduced into the canister 7 through the introduction pipe 71, and quantity of octane sorbed was determined. Table 2 shows the quantity (g) of octane sorbed by 630 g of layered porous silica.

After the sorption, purging air was introduced into the canister via the air-feeding pipe 73, so as to desorb the sorbed octane.

The operation was repeated twice, and the quantity of octane sorbed by the sorbent was determined. Results obtained are shown in Table 2.

For the purpose of comparison, 560 g of active carbon (Kuraray Coal) was charged into the same canister 7 and subject to the same test. Results obtained are shown in Table 2.

As is seen from the table, the canister charged with the layered porous silica according to this invention has an excellent capability of capturing octane vapor, and the capability remains almost uncharged with no substantial deterioration even in the third sorption cycle.

On the other hand, the capability of active carbon of capturing octane decreases in the second sorption cycle to only about 80% of that in the first sorption cycle, and the capability further decreases in the third sorption cycle.

TABLE 2

| | Quantity of Octane Sorbed (g) | |
|---|---|---|
| Sorption Cycle | Layered Porous Silica | Active Carbon |
| First | 255 | 238 |
| Second | 250 | 188 |
| Third | 251 | 185 |

Example 3

Figure 5:
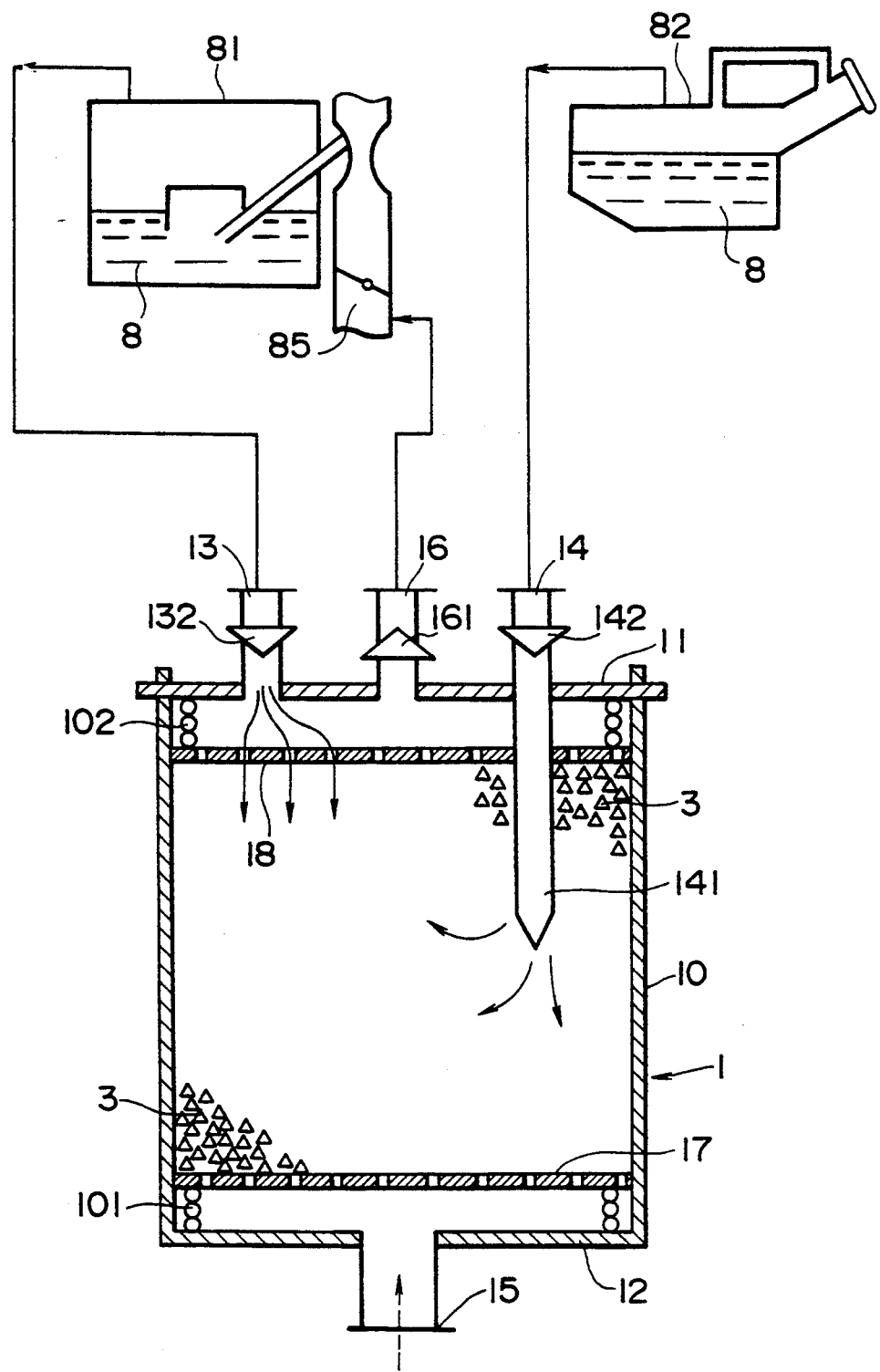
FIG. 5 is a schematic view illustrating a fuel-sorbing device according to Example 3.

In this example, there was used a fuel-sorbing device as shown in FIG. 5.

The device is a canister for automobiles. The canister 1 is composed of granules of a sorbent (layered porous silica) 3 and a main body 10 for housing the sorbent.

The main body 10 is cylindrical. It is provided with a lid 11 at the upper end, and a bottom plate 12 at the lower end. The lid 11 is provided with a first introduction pipe 13, a purge pipe 16, and a second introduction pipe of which tip 14 is inserted into the interior of the main body 10. The first introduction pipe 13 is connected to the upper space in the float chamber of a carburetor 81, and the second introduction pipe 14 is connected to a fuel tank 82.

The bottom plate 12 has an opening at which a purge pipe 15 is fitted. The pipes 13, 14 and 16 are provided with valves 132, 142 and 161, respectively. A perforated plate 17 is positioned in the lower part of the main body 10, and a perforated plate 18 is positioned in its upper part. In the space between the perforated plates 17 and 18 are filled granules of a layered porous silica sorbent 3 according to this invention.

In FIG. 5, numeral 8 indicates gasoline, and numerals 101 and 102 indicate springs for supporting or pressing the perforated plates 17 and The canister 1 captures evaporated fuel in the following manner. Vapor of gasoline generated in the float chamber of the carburetor 81 or in the fuel tank 82 travels via the first introduction pipe 13 or the second introduction pipe 14 into the canister 1. The vapor then passes through the perforated plate 18 into the layer of the sorbent 3, where it is contacted with and sorbed by the sorbent 3.

During the sorption, the valves 132 and 142 of the pipes 13 and 14 are open, and the valve 161 of the purge pipe 16 is closed.

The sorbent 3, after having sorbed a large quantity of gasoline vapor, is subjected to regeneration. The generation of the sorbent is performed by introducing air from the purge pipe 15 and discharging the exhaust into a purge port 85 via the purge pipe 16, with the valves 132, 142 and 162 at reversed positions.

During the regeneration or purging, the air introduced from the purge pipe 15 plays the role of desorbing the sorbed gasoline from the sorbent 3 and the role of discharging it, as described above.

By using the device according to this example, gasoline vapor (or evaporated fuel) can be captured in a highly effective manner by the layered porous silica.

Example 4

Figure 6:
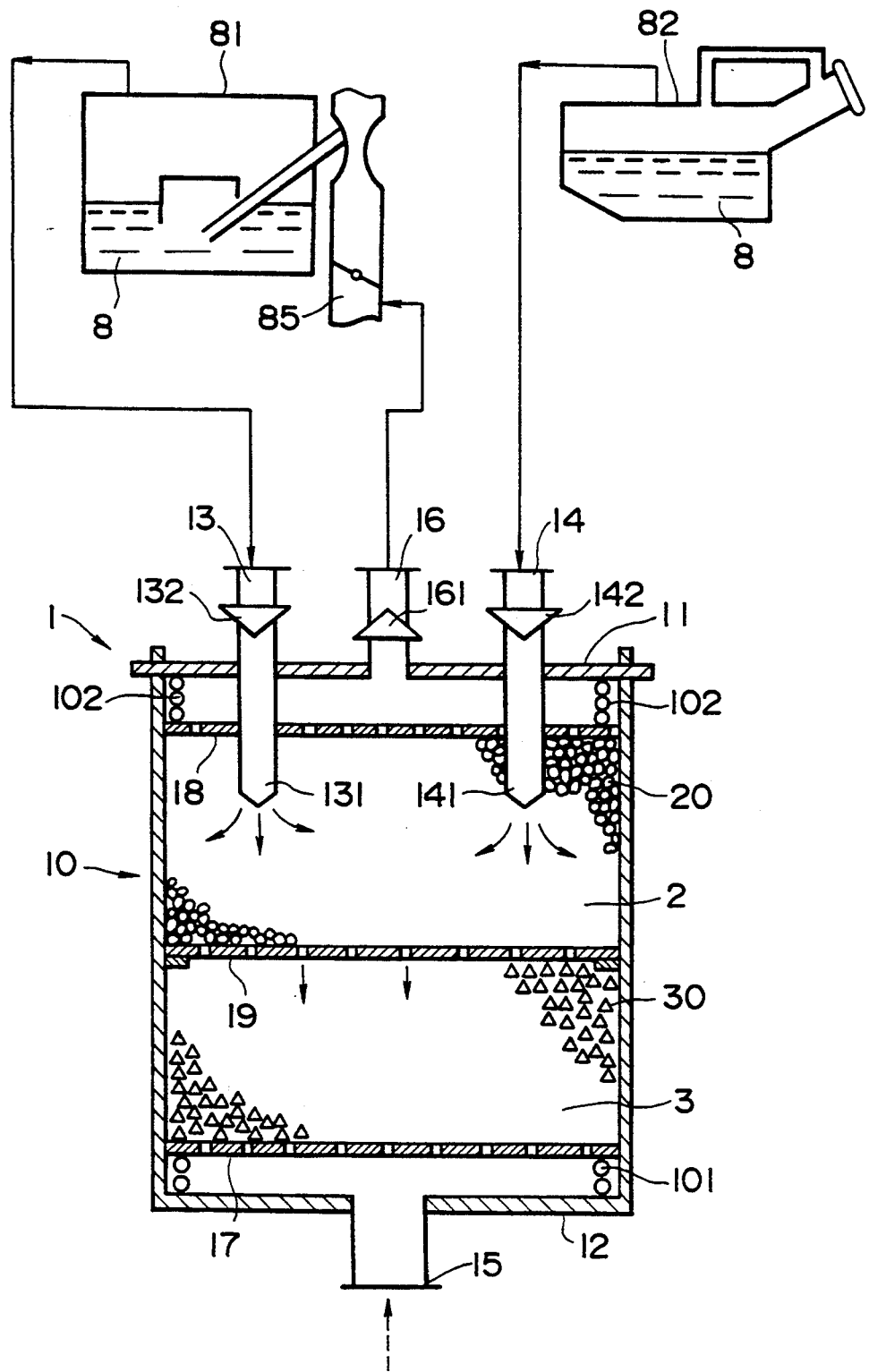
FIG. 6 is a schematic view illustrating a fuel-sorbing device according to Example 4.

In this example, there was used a fuel-sorbing device as shown in FIG. 6.

The device has a structure similar to the one shown in FIG. 5, except the followings: The main body (or container for sorbents) 10 is divided into a first sorbing chamber 20 positioned in the upper part of the container and a second sorbing chamber 30 positioned in the lower part of the container, the first chamber 20 being charged with an organic polymer sorbent 2 and the second chamber being charged with a layered porous silica sorbent 3. A perforated plate 19 is positioned between the first and the second sorbing chambers 20 and 30. Also, the tip 131 of the first introduction pipe 13 is inserted into the interior of the first sorbing chamber 20.

In the device of this example, evaporated fuel introduced from the first and the second introduction pipes 13 and 14 is introduced into the second sorbing chamber 20 after having passed through the first sorbing chamber 20. Because of this, different functions can be performed by the two kinds of sorbents upon capturing of evaporated fuel, as described hereinbefore, and hence there can be provided a fuel-sorbing device having a further increased the capturing capability and durability.

What is claimed is:

1. A fuel-sorbing device comprising a sorbent for capturing evaporated fuel and a container having a chamber charged with the sorbent, the chamber having an inlet for receiving the evaporated fuel and transporting it to the sorbent and an outlet in fluid communication with the atmosphere, said sorbent including layered porous silica having a hydrophobic surface and formed of a plurality of layered adjacent silica sheets, the sheets having a repetitively bent surface and portions of adjacent sheets bent towards an adjacent sheet being bonded by a siloxane bond (Si—O—Si) formed from the condensation of silanol groups (SiOH) of adjacent sheets and portions bent away from an adjacent sheet defining pores between the sheets to form a three-dimensional framework with a honeycomb cross-section.

2. A fuel-sorbing device as set forth in claim 1, wherein a large number of pores having a diameter of 10 to 60 Å are formed between said adjacent sheets.

3. A fuel-sorbing device as set forth in claim 1, wherein said layered porous silica is a product synthesized from crystalline layered sodium silicate.

4. A fuel-sorbing device as set forth in claim 3, wherein said crystalline layered sodium silicate is at least one selected from the group consisting of kanemite, sodium disilicate, makatite, ilerite, magadiite and kenyaite.

5. A fuel-sorbing device as set forth in claim 1, wherein said layered porous silica is in the form of granules.

6. A fuel-sorbing device as set forth in claim 5, wherein said layered porous silica is in the form of spheres having a diameter of 0.1 to 10 mm or columns having a diameter of 0.1 to 5 mm and a length of 1 to 30 mm.

7. A fuel-sorbing device including sorbents for capturing evaporated fuel, comprising: a container for housing the sorbents and into which the evaporated fuel is introduced, said container including a first chamber charged with a sorbent other than layered porous silica and a second chamber charged with layered porous silica, the first chamber having an inlet through which fuel is introduced and an outlet to the second chamber, the second chamber having an outlet in communication with the atmosphere, said sorbent other than layered porous silica being capable of being swollen by the evaporated fuel, the layered porous silica having a hydrophobic surface and being formed of adjacent sheets having a repetitively bent surface with portions bent toward an adjacent sheet being bonded by a siloxane bond (Si—O—Si) formed from the condensation of silanol groups (SiOH) of adjacent sheets and portions bent away from an adjacent sheet defining pores between the sheets to form a three dimensional framework having a honeycomb cross section and said first and second chambers being so constituted that the evaporated fuel is introduced into said second chamber after having passed through said first chamber.

8. A fuel-sorbing device as set forth in claim 7, wherein said sorbent other than layered porous silica includes at least one member selected from the group consisting of organic polymers which are capable of being swollen by the evaporated fuel, active carbon, zeolite material and silica gel.

9. A fuel-sorbing device as set forth in claim 8, wherein said organic polymer is at least one member selected from the group consisting of thermoplastic resins, thermosetting resins, natural rubbers, products similar to natural rubbers, synthetic rubbers, and thermoplastic elastomers.

10. A fuel-sorbing device as set forth in claim 8, wherein said organic polymer contains silicon.

11. A fuel-sorbing device as set forth in claim 10, wherein said organic polymer contains silicon in its main chain.

12. A fuel-sorbing device as set forth in claim 8, wherein said organic polymer is in the form of powders, granules, films, threads, honeycombs or plates.

13. A fuel-sorbing device as set forth in claim 8, wherein said organic polymer is added with at least one member selected from the group consisting of crosslinking agents, crosslinking accelerators, plasticizers, stabilizers, coloring agents, reinforcing agents, surface-treating agents, slippery agents, age resistors, antioxidants and flame retardants.

14. A fuel-sorbing device as set forth in claim 7, wherein said evaporated fuel is introduced via a passage into said second chamber after having passed through said first chamber.

* * * * *